United States Patent
Moore et al.

(10) Patent No.: US 8,948,745 B2
(45) Date of Patent: Feb. 3, 2015

(54) ROGUE TOWER DETECTION IN A WIRELESS NETWORK

(75) Inventors: Devin C. Moore, Lewis Center, OH (US); Wade P. Thompson, Moore, SC (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 701 days.

(21) Appl. No.: 12/938,468

(22) Filed: Nov. 3, 2010

(65) Prior Publication Data

US 2012/0108227 A1 May 3, 2012

(51) Int. Cl.
*H04W 24/00* (2009.01)
*H04W 12/12* (2009.01)
*H04W 12/04* (2009.01)
*H04W 24/04* (2009.01)
*H04W 36/00* (2009.01)

(52) U.S. Cl.
CPC .............. *H04W 12/12* (2013.01); *H04W 12/04* (2013.01); *H04W 24/04* (2013.01); *H04W 36/0083* (2013.01)
USPC ............................ 455/425; 370/331; 370/338

(58) Field of Classification Search
None
See application file for complete search history.

(56) References Cited

U.S. PATENT DOCUMENTS

| | | | |
|---|---|---|---|
| 2007/0049323 A1* | 3/2007 | Wang et al. | 455/525 |
| 2008/0123607 A1* | 5/2008 | Jokela | 370/338 |
| 2009/0041250 A1* | 2/2009 | Park et al. | 380/277 |
| 2009/0286512 A1* | 11/2009 | Huber et al. | 455/411 |
| 2011/0263282 A1* | 10/2011 | Rune et al. | 455/507 |

* cited by examiner

*Primary Examiner* — Marcos Batista

(57) ABSTRACT

A system associated with a first tower in a wireless network receives, at the first tower, tower lists generated by other towers that are nearby the first tower. The system further authenticates each of the received tower lists, and identifies ones of the nearby towers as rogue towers based on failures to authenticate respective ones of the received additional tower lists. The system also broadcasts a tower black list that lists the identified rogue towers to the nearby towers and to nearby mobile devices.

18 Claims, 19 Drawing Sheets

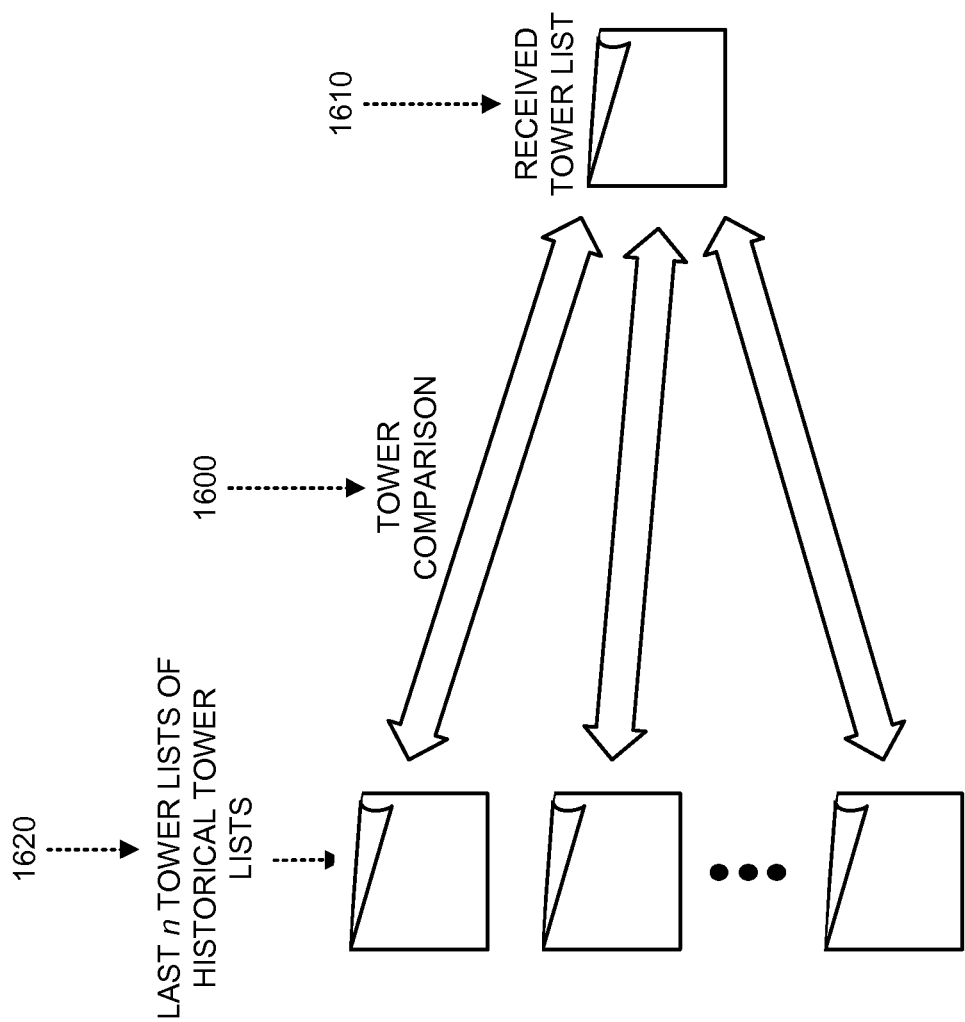

ROGUE TOWER DETECTION IN A WIRELESS NETWORK

BACKGROUND

Wireless networks, such as cellular wireless networks, include geographically positioned towers that provide wireless connectivity to mobile devices roaming in proximity to the towers. Towers in such cellular wireless networks are typically positioned to provide overlapping wireless coverage such that roaming mobile devices are able to maintain a connection to the network at all times.

BRIEF DESCRIPTION OF THE DRAWINGS

FIGS. 13-16 are exemplary diagrams associated with the exemplary process of FIGS. 13-16.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
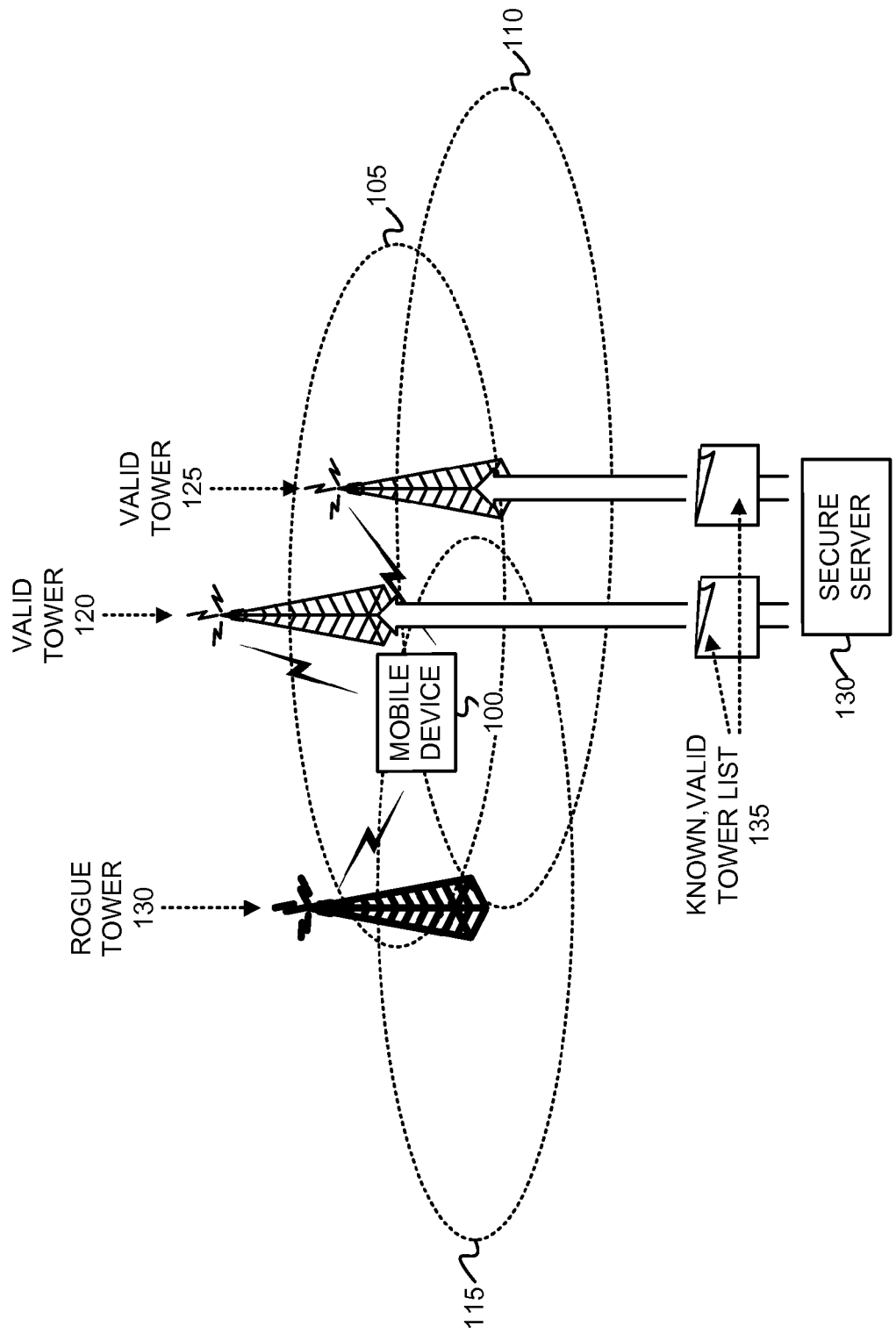
FIG. 1 is a diagram that depicts an overview of an exemplary environment in which rogue towers—towers placed in a cellular network to erroneously route or record cell traffic from/to a connected mobile device—may be detected and isolated from use.

Exemplary embodiments described herein operate in a wireless network environment in which rogue towers—towers that erroneously route or record cell traffic from/to a connected mobile device (e.g., cellular telephone)—are improperly placed within the wireless network to misroute or record network traffic. FIG. 1 depicts an overview of an exemplary environment in which rogue towers may be detected and isolated from use. As a mobile device 100, such as, for example, a cellular telephone, roams from cell to cell within a wireless network (e.g., a cellular network), mobile device 100 may connect, via a wireless link, with one or more corresponding towers to obtain wireless network service. For example, as shown in FIG. 1, mobile device 100 may roam in the vicinity of cells 105, 110 and 115, having respective towers 120, 125 and 130. Conventionally, as mobile device 100 roams within cells 105, 110 and 115, mobile device 100 would not have any knowledge of whether any of towers 120, 125 or 130 may include a rogue tower to which mobile device 100 should not connect. Therefore, under conventional circumstances, mobile device 100 may improperly connect to rogue tower 130 which, in turn, may erroneously route or record traffic to and from mobile device 100.

Using rogue tower detection techniques described herein, mobile devices roaming within a wireless network, and known, valid towers may identify and isolate rogue towers to prevent the rogue towers from sending traffic to, or receiving traffic from, the known, valid towers and/or the mobile devices. As shown in FIG. 1, a secure server 130, having knowledge of towers in a wireless network that are valid (e.g., properly registered with the secure server at the time each tower is placed into operation), may construct a list 135 of known, valid towers and may send a copy of the list to each known, valid towers (e.g., towers 120 and 125). The list of known, valid towers 135 may include a unique identifier for each known, valid tower, and an authentication token for each tower that has been received from each tower. As described in further detail below, known, valid tower list 135 may be used by valid towers 120 and 125 in identifying tower 130 as a rogue tower. Valid towers 120 and 125 may, in turn, generate their own respective local tower lists that identify towers known to them as being valid and may further broadcast those local tower lists to mobile device 100 when mobile device 100 enters a respective cell. Mobile device 100 may use these broadcast tower lists to identify valid towers to which it can properly connect, and rogue towers to which it should avoid connecting. In this way, the detection of rogue towers is "crowd sourced" in that each device in the network may contribute to the detection of rogue towers.

Figure 2:
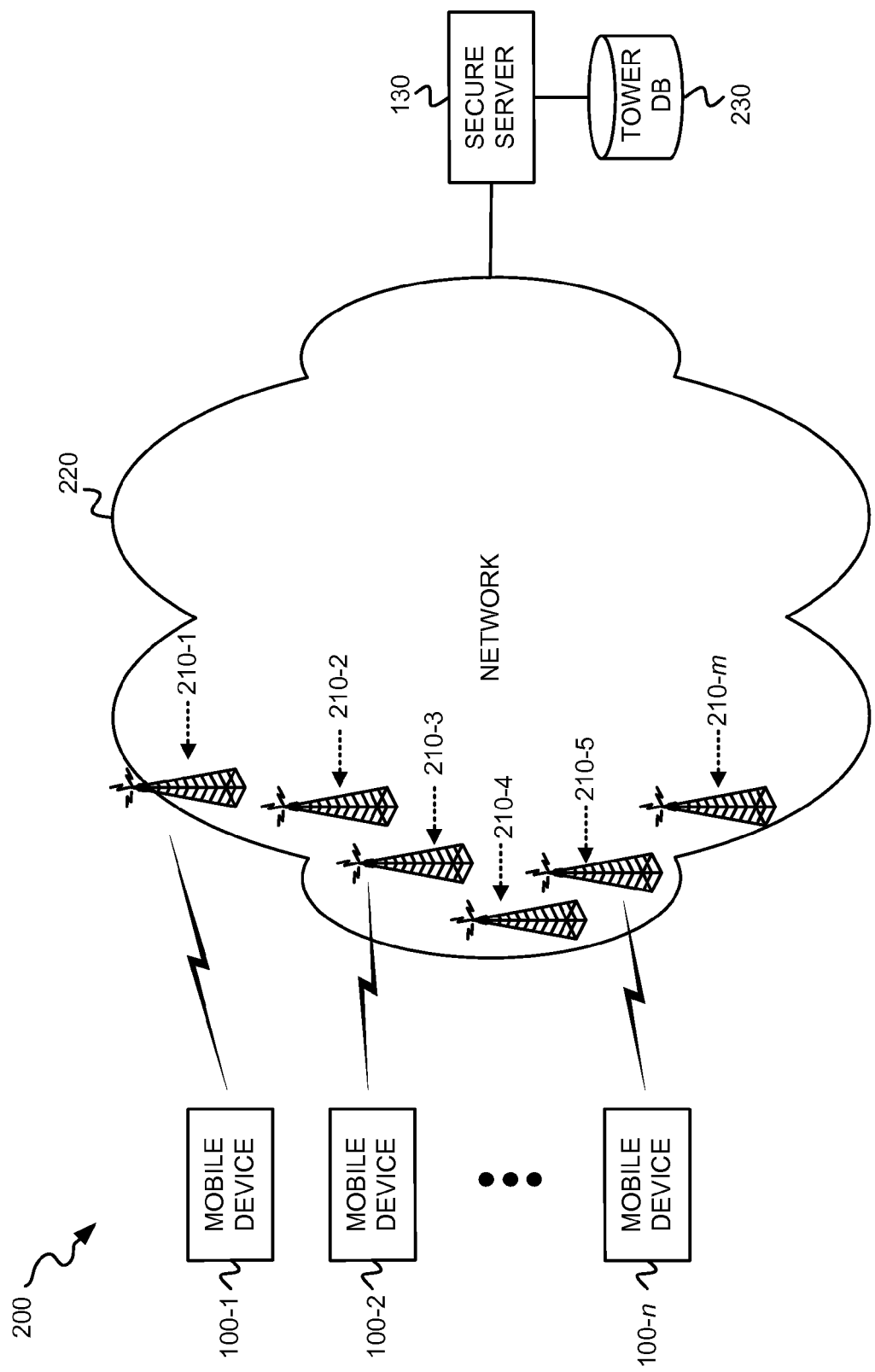
FIG. 2 is a diagram that depicts an exemplary network environment in which rogue tower detection and isolation techniques may be implemented.

FIG. 2 is a diagram that depicts an exemplary network environment 200 in which rogue tower detection and isolation techniques, as described further below, may be implemented. Network 200 may include multiple mobile devices 100-1 through 100-n (where n is any integer)(mobile devices 100-1 through 100-n may be referred to herein generally and individually as a "mobile device 100"), a network 220 that may further include multiple towers 210-1 through 210-m (where m is any integer)(towers 210-1 through 210-m may be referred to generally and individually herein as a "tower 210"), a secure server 130, and a tower database (db) 230.

Mobile device 100 may include any type of mobile electronic device that includes wireless communication capabilities. For example, mobile device 100 may include a desktop, laptop, palmtop or tablet computer, a cellular telephone, or a personal digital assistant (PDA). Mobile device 100 may include wireless transceivers for communicating via towers 210-1 through 210-m via wireless links.

Tower 210 may include a cellular network radio tower that may include one or more antennas (e.g., antenna arrays) for transmitting traffic to, and receiving traffic from, mobile device 100. Tower 210 may additionally include (not shown) a base station that interconnects tower 210 with network 220.

Network 220 may include a wireless network that may further include a wireless satellite network, or a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN not specifically described herein. In addition to a wireless network, network 220 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network).

Secure server 130 may include a network device that may communicate with selected towers of towers 210-1 through 210-m to distribute lists of known, valid towers that may be used by the towers to identify and isolate rogue towers.

Figure 3:
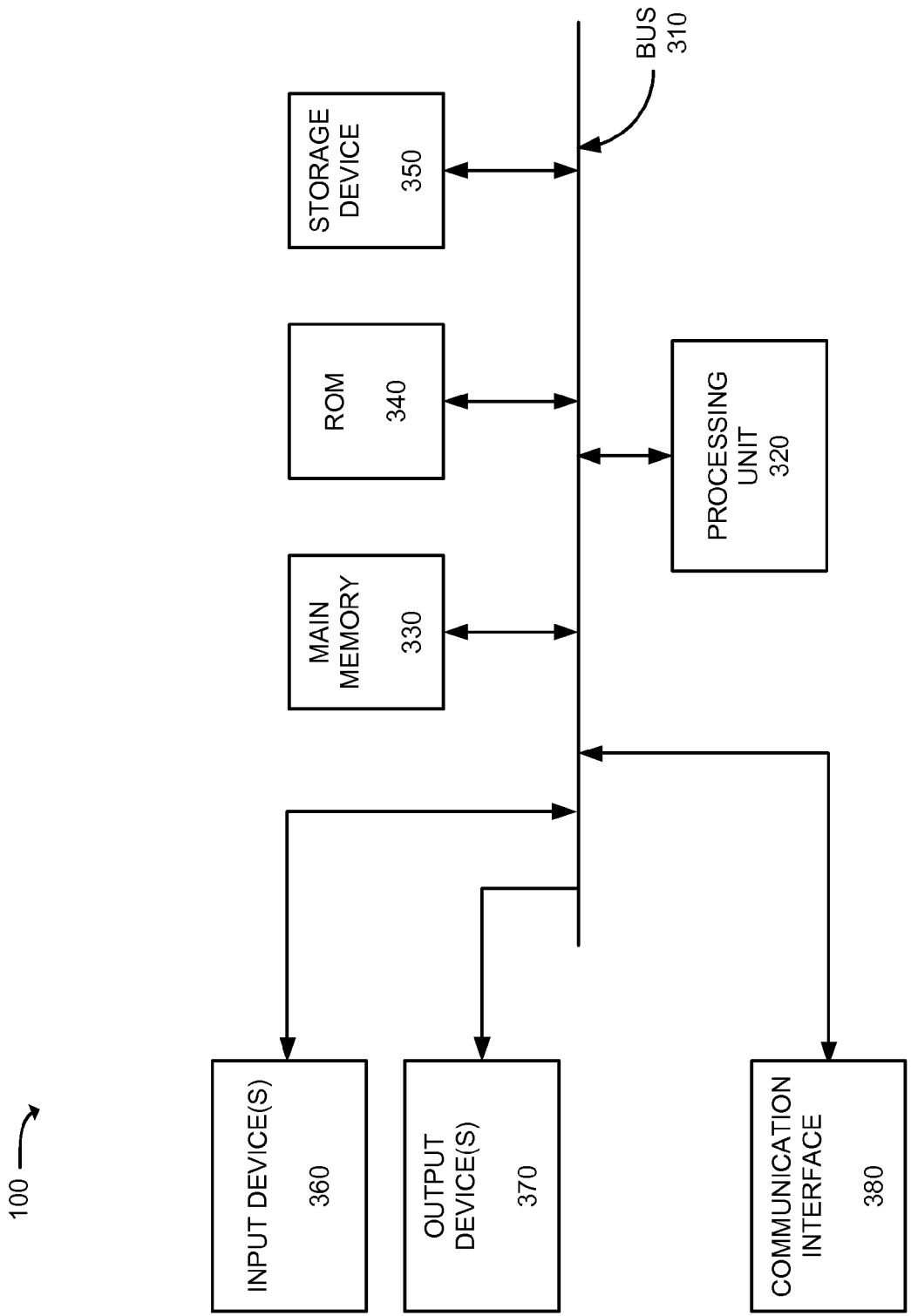
FIG. 3 is a diagram that depicts exemplary components of a mobile device of FIG. 2.

Tower database (DB) 230 may store certain data associated with selected ones of towers 210-1 through 210-m. Such data may include an authentication key that a respective tower may use to authenticate itself with secure server 130. The data stored in tower DB may further include a unique identifier for selected ones of towers 210-1 through 210-m and FIG. 3 is a diagram that depicts exemplary components of mobile device 100. Mobile device 100 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of mobile device 100.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to mobile device 100, such as, for example, a keypad or a keyboard, voice recognition and/or biometric mechanisms, etc. Output device (s) 370 may include one or more mechanisms that output information to the operator, including a display, a speaker, etc. Communication interface 380 may include any transceiver mechanism that enables mobile device 100 to communicate with other devices and/or systems. For example, communication interface 380 may include mechanisms for communicating with another device or system via a network, such as network 220.

Mobile device 100 may perform certain operations or processes, as described below. Mobile device 100 may perform these operations in response to processing unit 320 executing software instructions contained in a computer-readable medium, such as memory 330. A computer-readable medium may include a physical or logical memory device. A logical memory device may include memory space within a single physical memory device or spread across multiple physical memory devices.

The software instructions may be read into main memory 330 from another computer-readable medium, such as storage device 350, or from another device via communication interface 380. The software instructions contained in main memory 330 may cause processing unit 320 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of mobile device 100 illustrated in FIG. 3 is for illustrative purposes only. Other configurations may be implemented. Therefore, mobile device 100 may include additional, fewer and/or different components than those depicted in FIG. 3.

Figure 4:
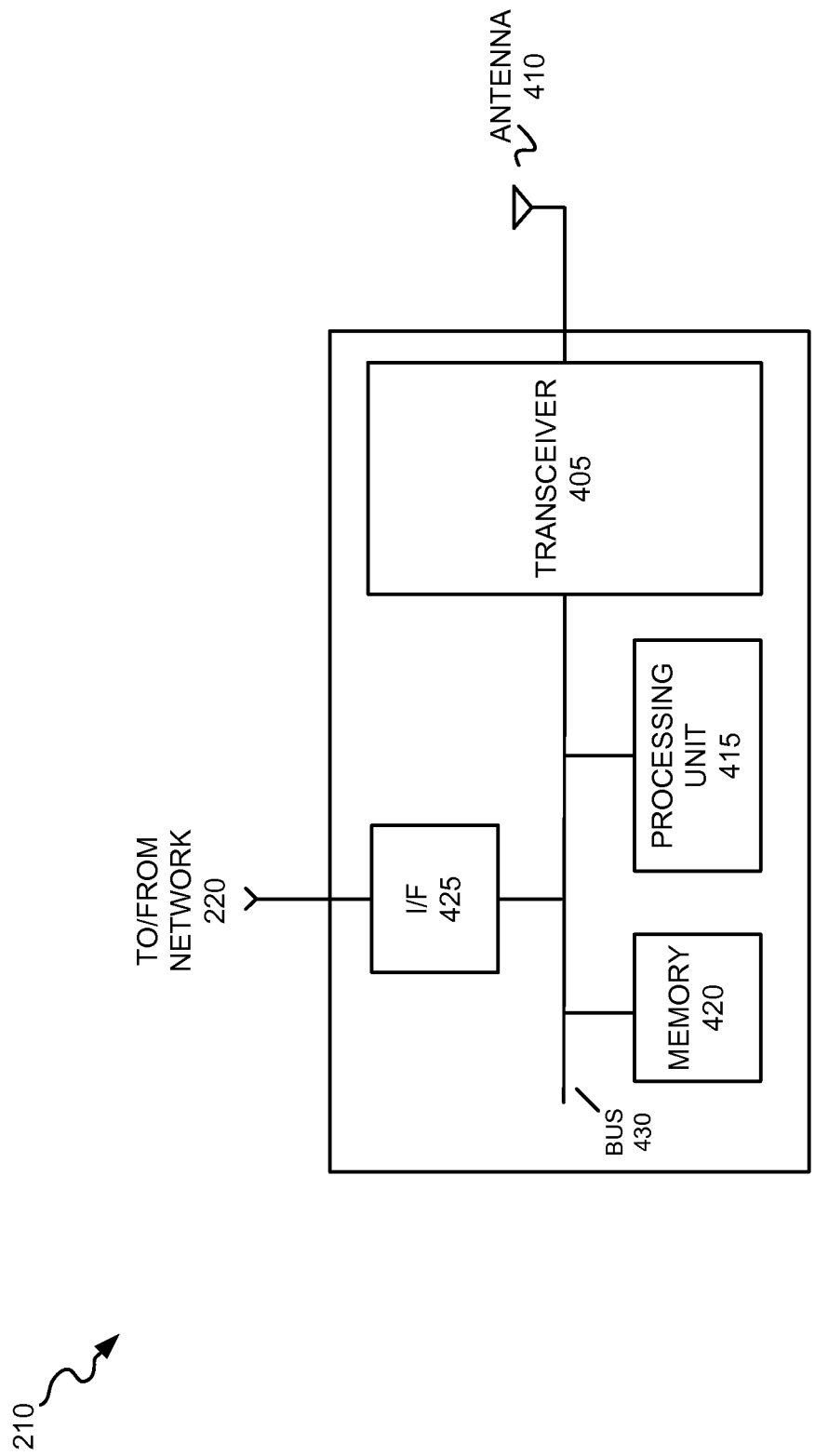
FIG. 4 is a diagram that depicts exemplary components of a tower of FIG. 2.

FIG. 4 is a diagram that depicts exemplary components of a tower 210. Tower 210 may include components associated with a base station, in addition to an antenna, antennas or an antenna array, and a physical tower structure. As shown in FIG. 4, tower 210 may include a transceiver 405, an antenna 410, a processing unit 415, a memory 420, an interface (I/F) 425, and a bus 430.

Transceiver 405 may include a wireless transceiver that enables tower to communicate with mobile devices 100 via wireless connections. Antenna 410 may any type of antenna, antennas, or an antenna array for transmitting and/or receiving signals via wireless connections.

Processing unit 415 may include a processor, microprocessor, or processing logic that may interpret and execute instructions. Memory 420 may include RAM, ROM and/or magnetic, flash, and/or optical recording mediums. Memory may store data and instructions for execution by processing unit 415. I/F 425 may include, for example, a wired interface for connecting tower 210 to network 220. I/F 425 may, for example, connect tower 210 to a base station controller, or similar device, in a cellular network. Bus 430 may include a path that permits communication among the elements of tower 210.

The configuration of components of tower 210 illustrated in FIG. 4 is for illustrative purposes only. Other configurations may be implemented. Therefore, tower 210 may include additional, fewer and/or different components than those depicted in FIG. 4.

Figure 5:
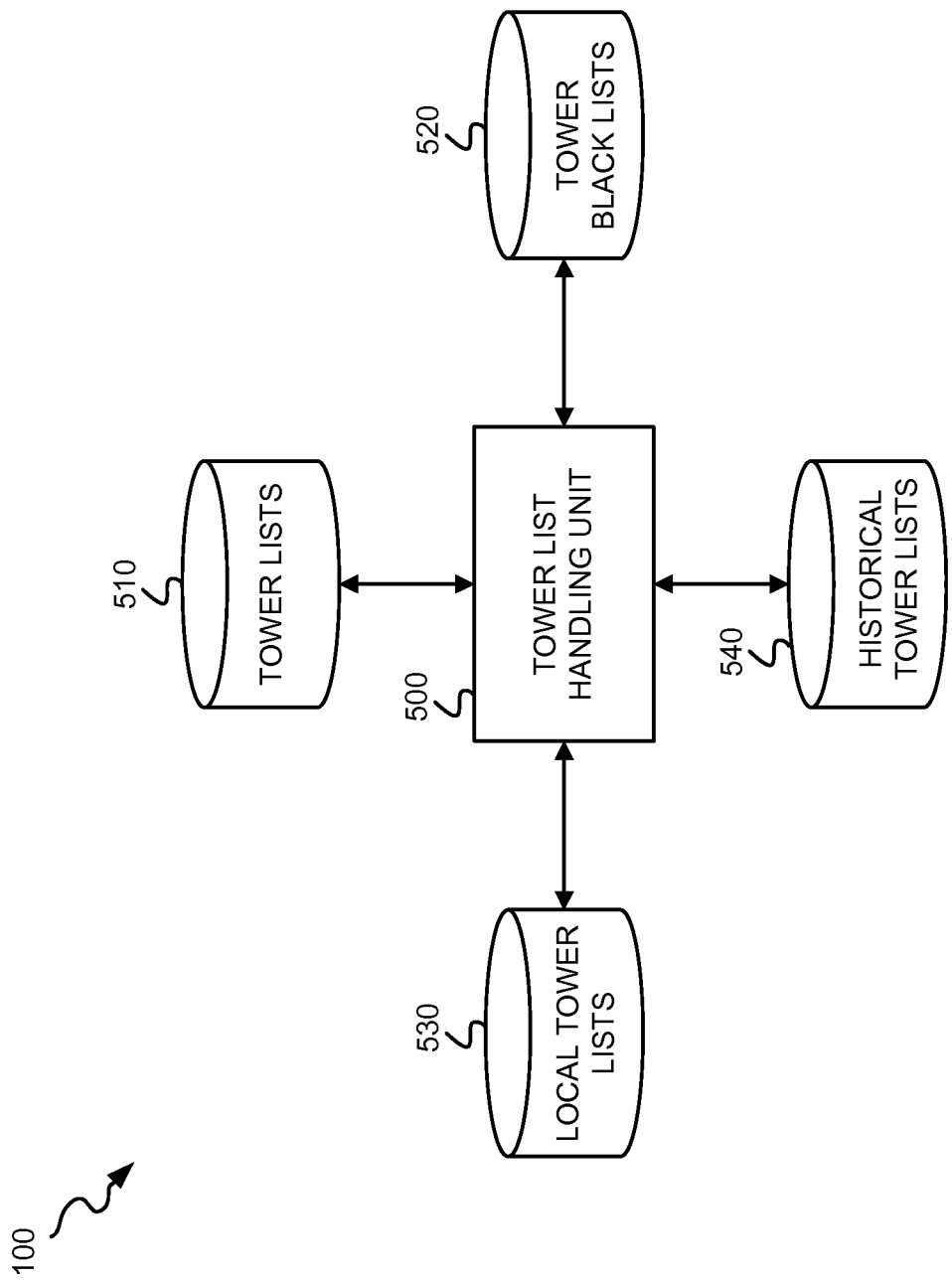
FIG. 5 is a diagram that depicts exemplary functional components of a mobile device of FIG. 2.

FIG. 5 is a diagram that depicts exemplary functional components of mobile device 100. Mobile device 100 may include a tower list handling unit 500, a tower lists 510 data structure, a tower black lists 520 data structure, a local tower lists 530 data structure, and a historical tower lists 540 data structure.

Tower list handling unit 500 may store and retrieve tower lists from data structures 510, 520, 530 and 540. Tower list handling unit 500 may additionally locate and retrieve specific data from the various tower lists stored in data structures 510, 520, 530 and 540.

Tower lists 510 data structure may store all tower lists broadcast from towers that are nearby mobile device 100. Tower black lists 520 data structure may store tower black lists, which identify rogue towers, of broadcast towers nearby mobile device 100. Local tower lists 530 data structure may store tower lists constructed and/or stored at mobile device 100. Local tower lists 530 data structure may store the most recently constructed local tower list and, possibly, the l most recently constructed local tower lists. Historical tower lists 540 data structure may store a sequential list of the p most recent tower lists received from towers 210.

The configuration of functional components of mobile device 100 illustrated in FIG. 5 is for illustrative purposes only. Other configurations may be implemented. Therefore, mobile device 100 may include additional, fewer and/or different components than those depicted in FIG. 5.

Figure 6A:
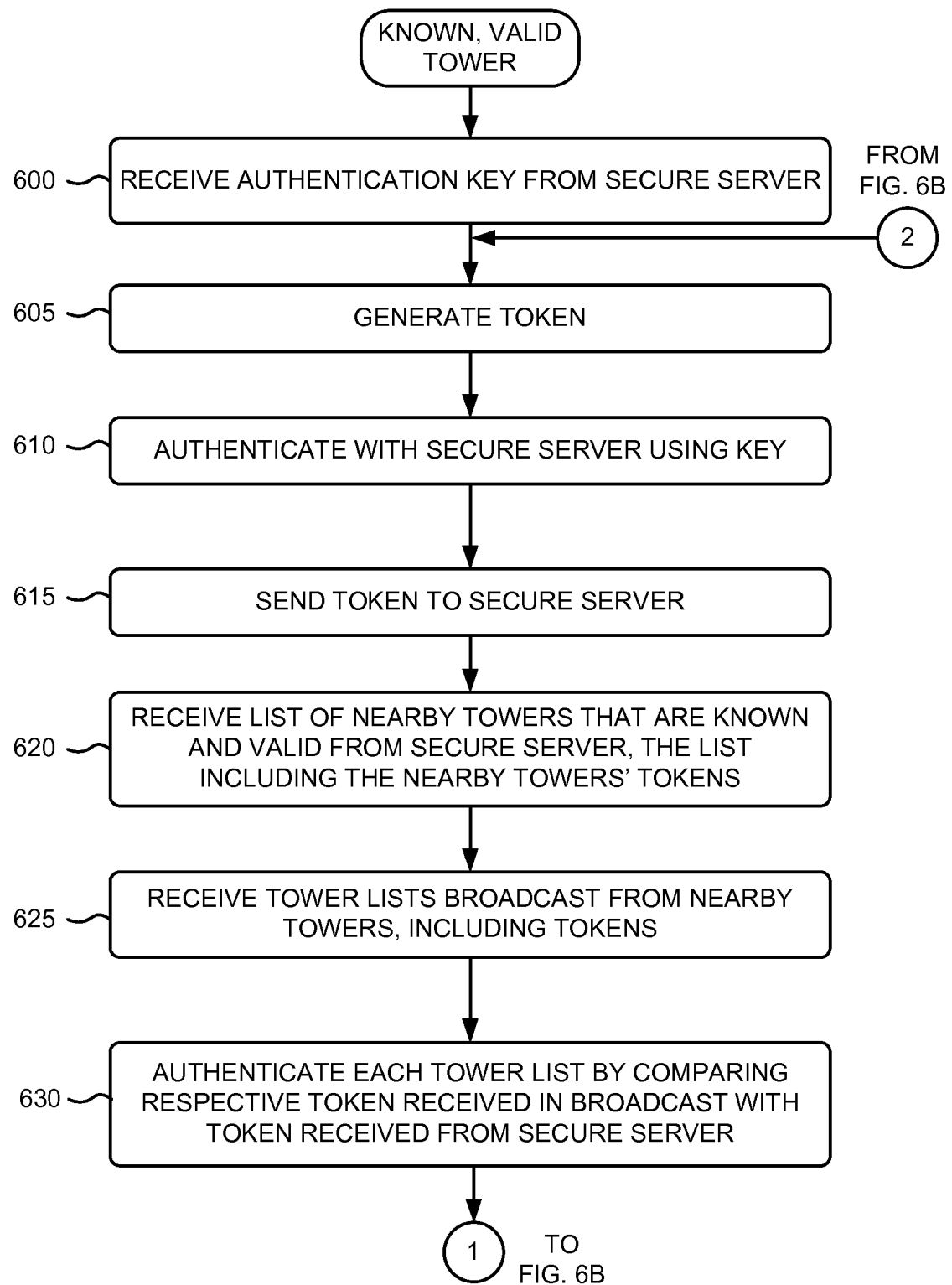
FIGS. 6A and 6B are flow diagrams illustrating an exemplary process for identifying rogue towers and identifying those rogue towers to other towers and to nearby mobile devices.
Figure 6B:
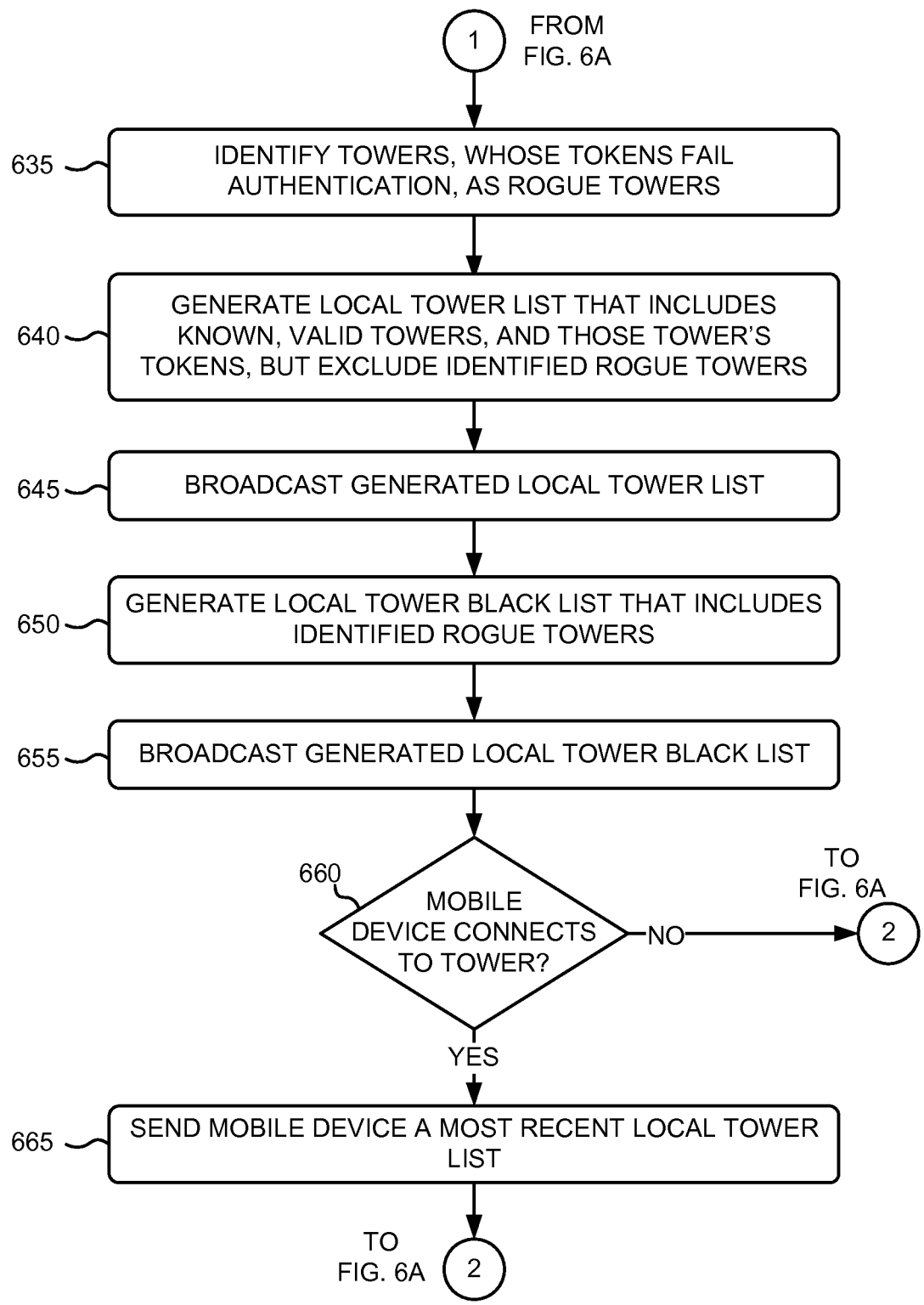

FIGS. 6A and 6B are flow diagrams illustrating an exemplary process identifying rogue towers and identifying those rogue towers to other towers and to nearby mobile devices. The exemplary process of FIGS. 6A and 6B may be implemented by a tower 210. For example, the exemplary process of FIGS. 6A and 6B may be implemented by processing unit 415 of tower 210, in conjunction with other components of tower 210 (e.g., memory 420). The description of the exemplary process of FIGS. 6A and 6B below may refer to the exemplary diagrams of FIGS. 7-11.

The exemplary process may include receiving an authentication key from secure server 130 (block 600). The authentication key may subsequently be used by tower 210 to authenticate tower 210 with secure server 130. Secure server 130 may generate an authentication key using existing techniques, such as public-private key encryption, and may provide the authentication key to tower 210. For example, secure server 130 may provide the authentication key at the time that tower 210 is initialized and connected to network 220 (e.g., over a known secure channel). Secure server 130 may, for example, periodically supply a new authentication key to tower 210. As shown in the messaging diagram of FIG. 7, secure server 130 sends an authentication key 700 to tower 210.

Tower 210 may generate a token (block 605). The token may include any type of data that may serve to authenticate tower 210 with other towers. For example, the generated token may include a unique number. In one implementation, the unique number may be processed by the application of a function (e.g., a hash function) to the unique number to generate the token. In this example, the hash function may be a "one-way" function that is computationally infeasible to reverse. For example, the token may be the hash of the following information concatenated together: the tower identifier, the date and/or time, and/or a pre-shared key. In one example, the pre-shared key may include the authentication key. Tower 210 may periodically generate the token, and provide the generated token to secure server 130. Referring to the messaging diagram of FIG. 7, tower 210 is depicted as generating 705 a token.

Figure 7:
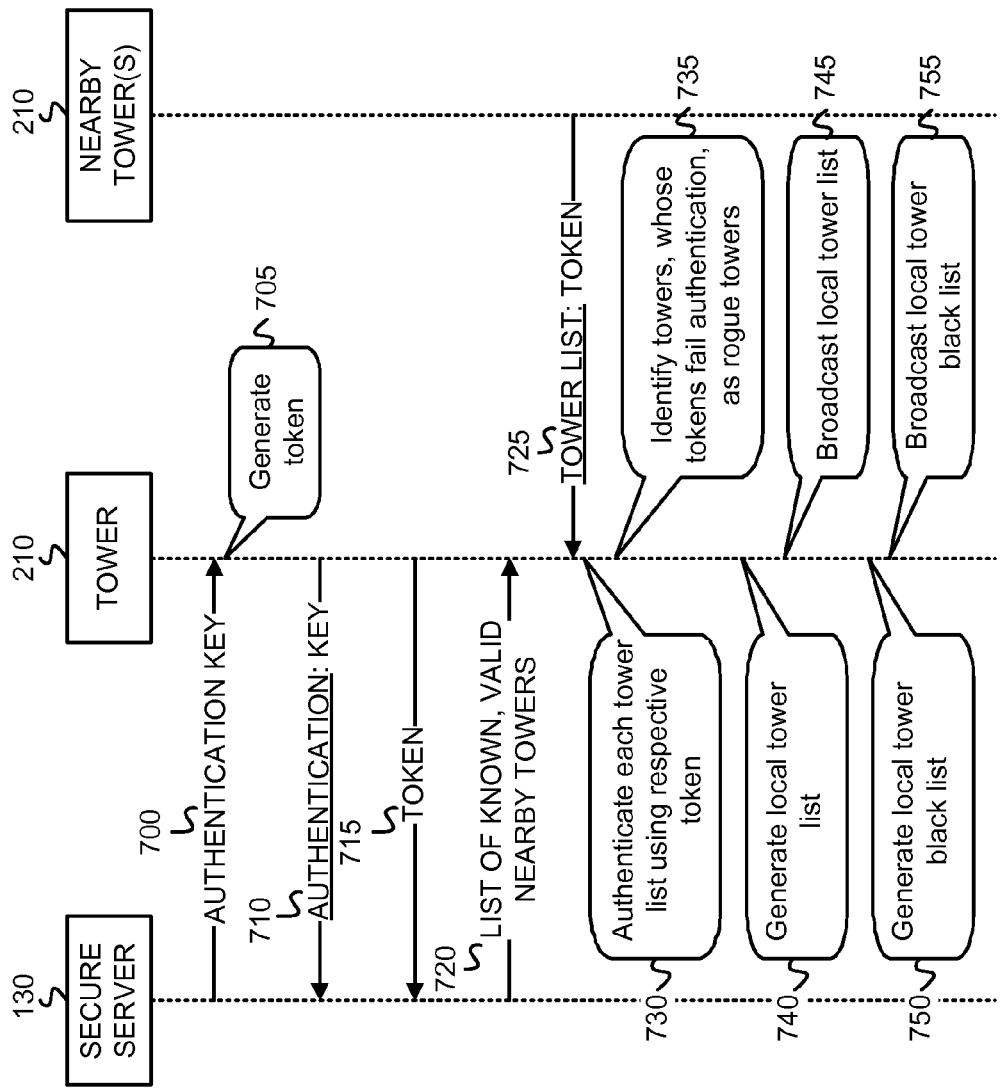
FIG. 7 is an exemplary messaging diagram associated with the exemplary process of FIGS. 6A and 6B.

Tower 210 may authenticate with secure server 130 using the authentication key received in block 600 (block 610). As shown in FIG. 7, tower 210 may send an authentication message 710 to secure server 130 that includes authentication key 700 previously sent from secure server 130 to tower 210. Upon receipt of authentication message 710, secure server 130 may verify the authentication key 700 to authenticate tower 210.

Figure 8:
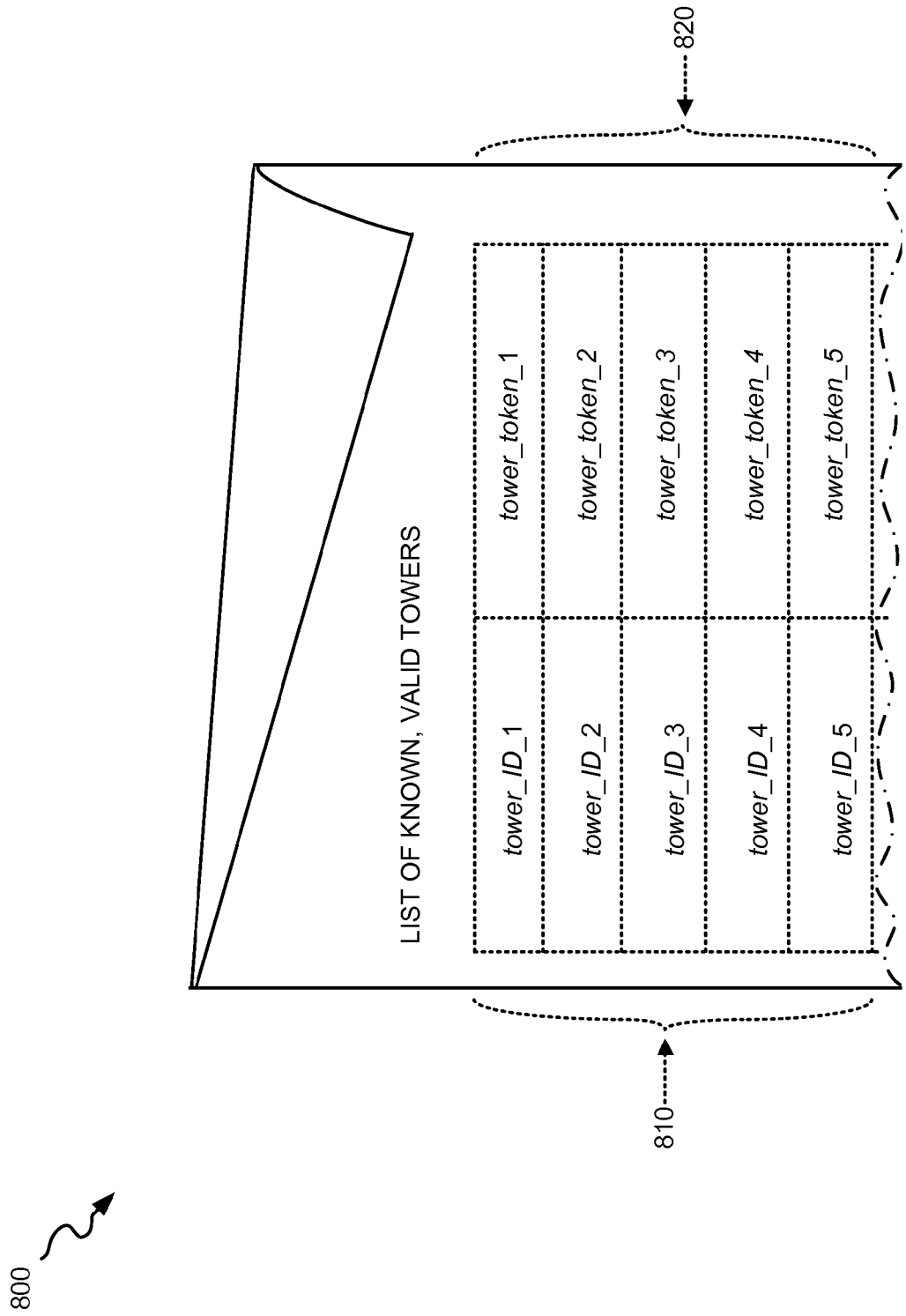
FIG. 8 is a diagram that depicts an exemplary list of known and valid towers sent from the secure server of FIG. 2.

The token generated in block 605 may be sent to secure server 130 (block 615). Once tower 210 has been authenticated by secure server 130, tower 210 may send the previously generated token. Upon receipt, secure server 130 may store the token in association with other data (e.g., unique identifier, etc.) associated with tower 210. FIG. 7 depicts tower 210 sending a message 715 that includes a token to secure server 130. Tower 210 may receive a list of nearby towers that are known to be valid from secure server 130, the list including the nearby towers'tokens (block 620). Secure server 130 may store a comprehensive list of towers that are known to be valid (i.e., not rogue) at the time that the towers are registered with secure server 130. Upon receipt of the token in block 615, secure server 130 may identify a subset of towers, from the comprehensive list of towers, which are located near tower 210 and may generate a list that includes the identified nearby towers. As shown in FIG. 7, secure server 130 may send the list 720 of known, valid nearby towers to tower 210. FIG. 8 depicts an example of a list 800 of nearby, known and valid towers that may be sent from secure server 130. As shown in FIG. 8, list 800 may include a list of unique identifiers 810 associated with each nearby, known and valid tower, and a list of respective tower tokens 820, with each tower token being associated with a respective unique tower identifier.

Figure 9:
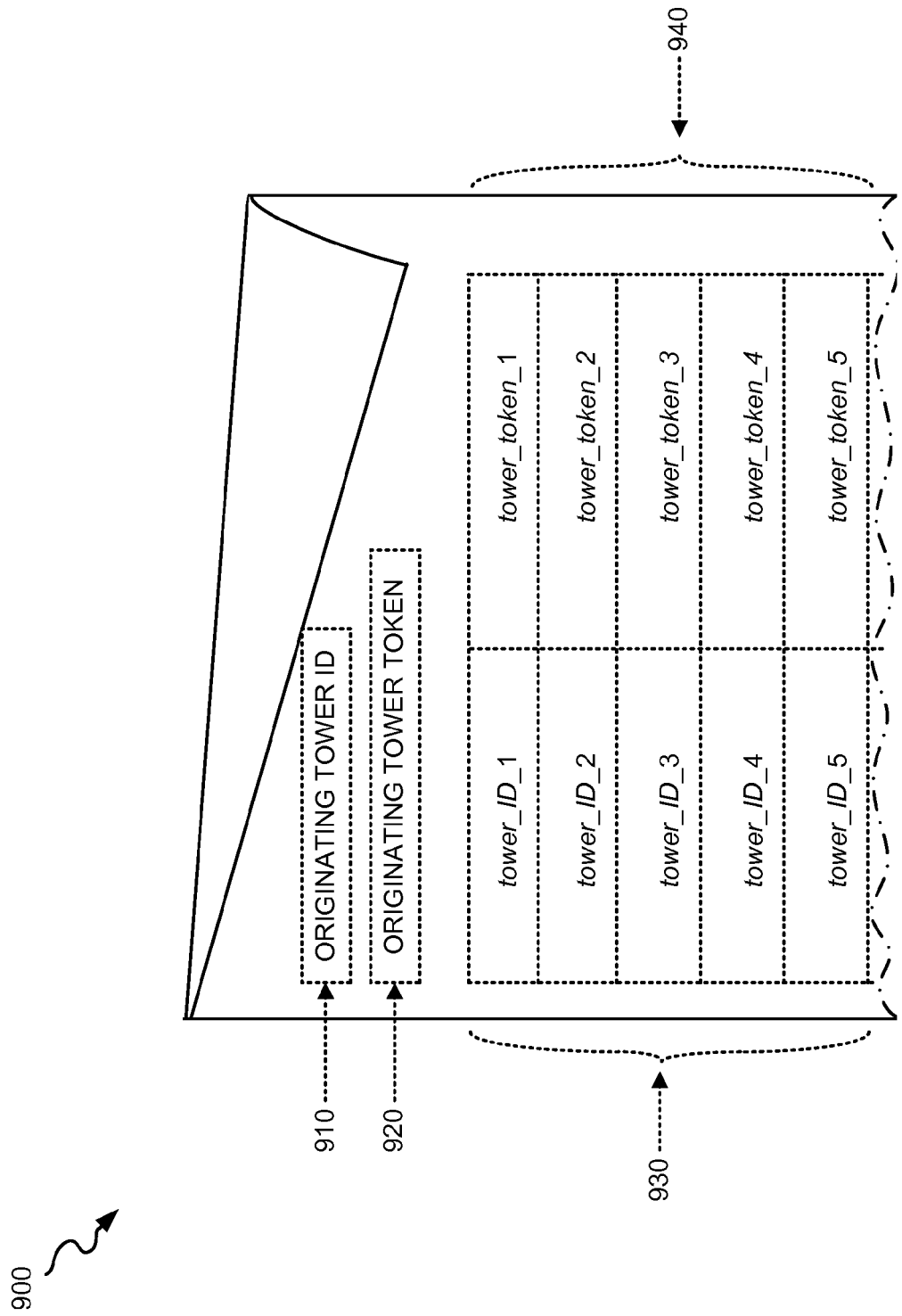
FIG. 9 is a diagram that depicts an exemplary tower list sent from the towers in FIG. 2.

Tower 210 may receive tower lists broadcast from nearby towers, with each tower list including respective tokens for each tower on the list and a token for the tower that broadcast the tower list (block 625). FIG. 7 depicts nearby towers 210 sending respective tower lists 725 to tower 210, with each tower list 725 including a token associated with the tower that sent the tower list. FIG. 9 depicts an example of a tower list 900 sent from one tower to another tower. As shown in FIG. 9, tower list 900 may include an originating tower identifier (ID) 910 and an originating tower token 920. The originating tower identifier 910 may include an identifier that uniquely identifies the tower that sent tower list 900. Originating tower token 920 may include the unique token generated by the tower 210 that sent tower list 900. Tower list 900 may further include a list of towers that are known to the tower that constructed and sent tower list 900. As shown in FIG. 9, list 900 may include a list of unique identifiers 930 associated with each tower known to the tower that constructed and sent tower list 900, and a list of respective tower tokens 940, with each tower token being associated with a respective unique tower identifier.

Figure 10:
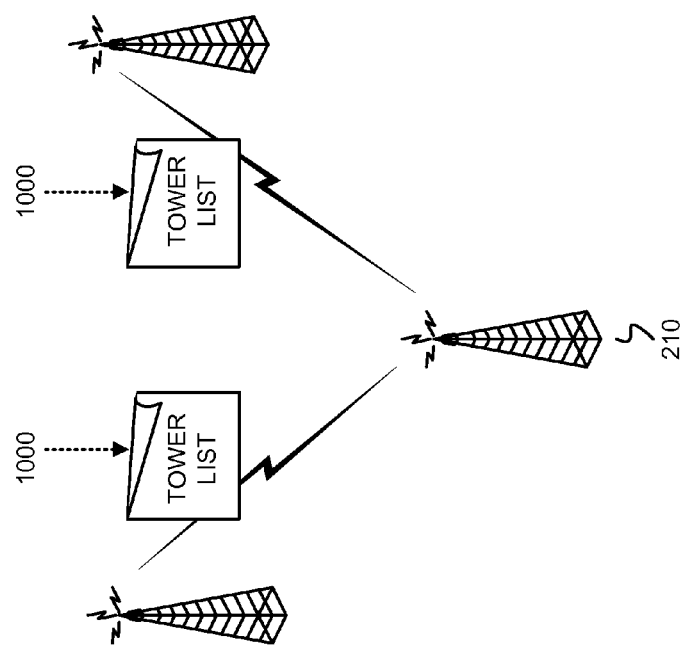
FIGS. 10 and 11 are exemplary diagrams associated with the exemplary process of FIGS. 6A and 6B.

Tower 210 may authenticate each tower list by comparing a respective token received in the broadcast tower list with a token received from secure server 130 in block 620 (block 630). FIG. 7 depicts tower 210 authenticating 730 each tower list received from nearby towers using a respective token (e.g., originating tower token 920) received in a broadcast tower list with a corresponding token received from secure server 130 (e.g., from list 800). Tower 210 may identify towers, whose tokens fail authentication, as rogue towers (block 635). FIG. 7 depicts tower 210 identifying 735 towers, whose tokens fail authentication, as rogue towers. Tower 210 may generate a local tower list that includes known, valid towers, and those towers' tokens, but excludes rogue towers identified in block 635 (block 640). Tower 210 may generate a local tower list, similar to tower list 900 of FIG. 9, which includes a list of other towers that are known to tower 210, and a list of respective tower tokens for each tower in the list. FIG. 7 depicts the generation 740 of a local tower list by tower 210. Tower 210 may broadcast the generated local tower list (block 645). FIG. 7 depicts tower 210 broadcasting 745 the generated local tower list. FIG. 10 further graphically shows tower 210 broadcasting a tower list 1000 to other, nearby towers. Towers surrounding a tower identified as a rogue tower may, in some implementations, use triangulation to identify the geographic location and the signal power of the rogue tower so as to differentiate it from a valid, non-rogue tower.

Tower 210 may generate a local tower black list that includes the rogue towers identified in block 635 (block 650). The generated local tower black list may be similar to list 900, with the primary difference being that the list of towers contained in the tower black list are those that were identified in block 635 as having failed authentication. FIG. 7 depicts the generation 750 of a local tower black list at tower 210. Tower 210 may broadcast the local tower black list generated in block 650 (block 655). FIG. 7 depicts tower 210 broadcasting 755 the generated local tower black list.

Figure 11:
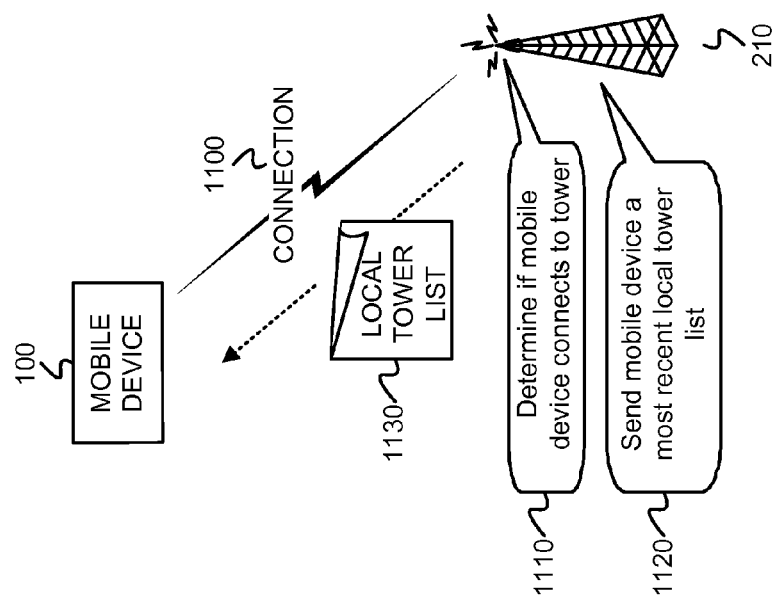

Tower 210 may determine if a mobile device 100 connects to tower 210 (block 660). A mobile device 100 may move sufficiently close to tower 210 to enable a wireless connection to be made between mobile device 100 and tower 210. Once it is sufficiently close to tower 210, mobile device 100 may decide to connect to tower 210 (as opposed to connecting to other towers that may be sufficiently close to mobile device 100). FIG. 11 depicts mobile device 100 establishing a wireless connection 1100 with tower 210. If mobile device 100 has not connected to tower 210 (NO—block 660), then the exemplary process may return to block 605 of FIG. 6A with the generation of a new token. If a mobile device 100 has connected to tower 210 (YES—block 660), then tower 210 may send mobile device 100 a most recent local tower list (block 665). The most recent local tower list may include the tower list generated in block 640. FIG. 11 depicts tower 210 determining 1110 if mobile device 100 has connected to tower 210, and tower 210 sending 1120 a most recent local tower list 1130 to mobile device 100. The exemplary process may then return to block 605 of FIG. 6A with the generation of a new token.

Figure 12A:
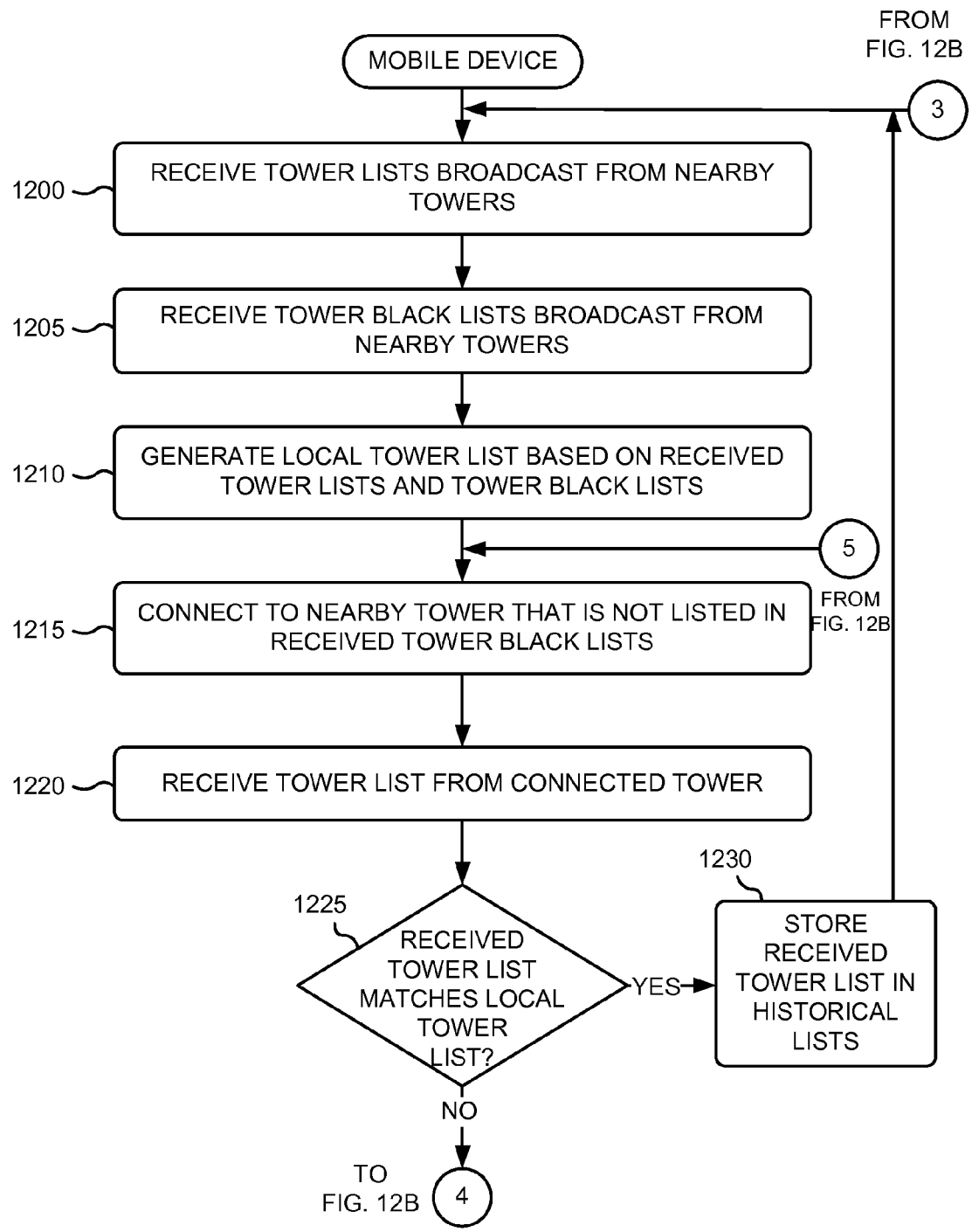
FIGS. 12A, 12B and 12C are flow diagrams illustrating an exemplary process for identifying rogue towers and identifying those rogue towers to other towers and to nearby mobile devices.
Figure 12B:
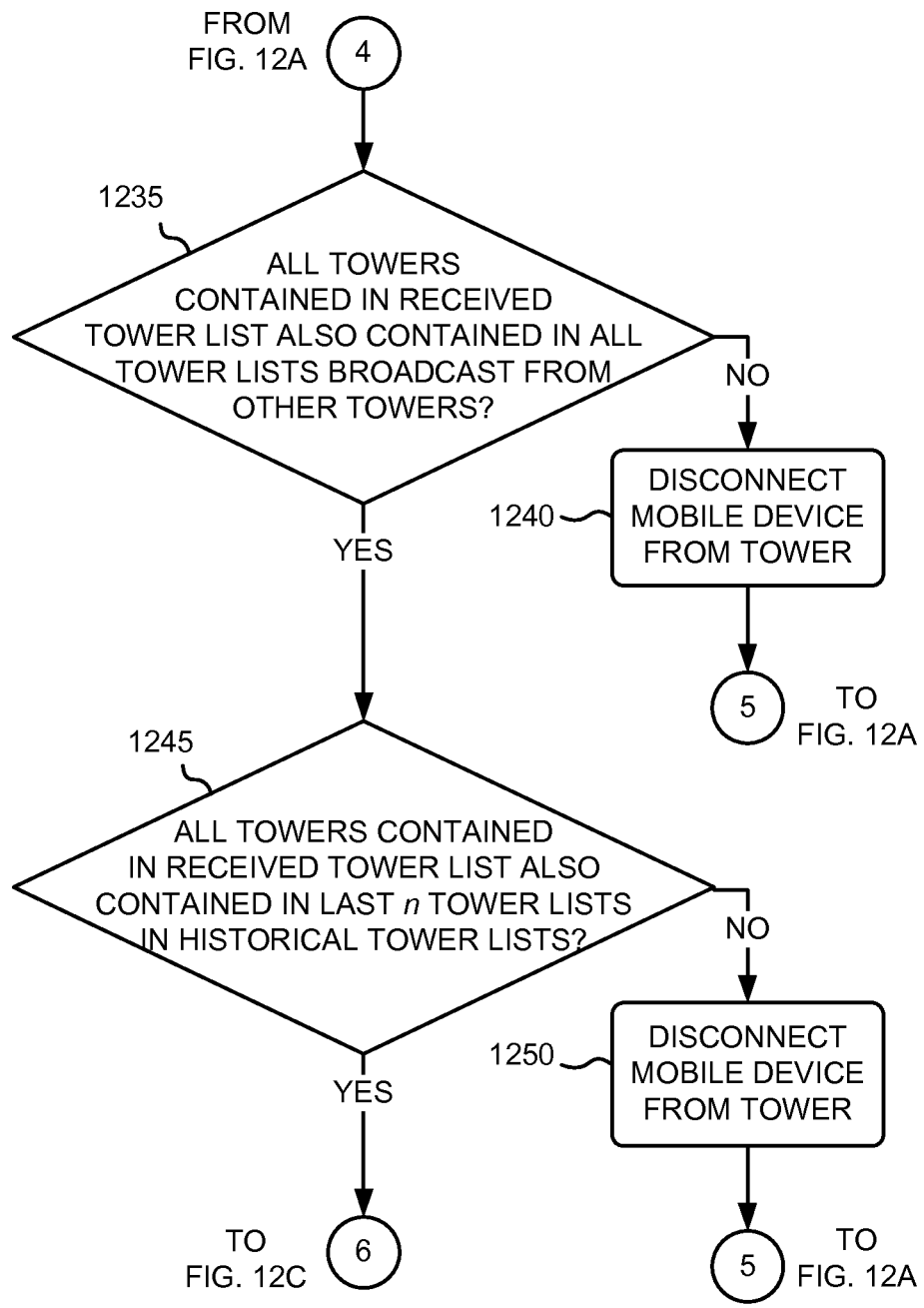
Figure 12C:
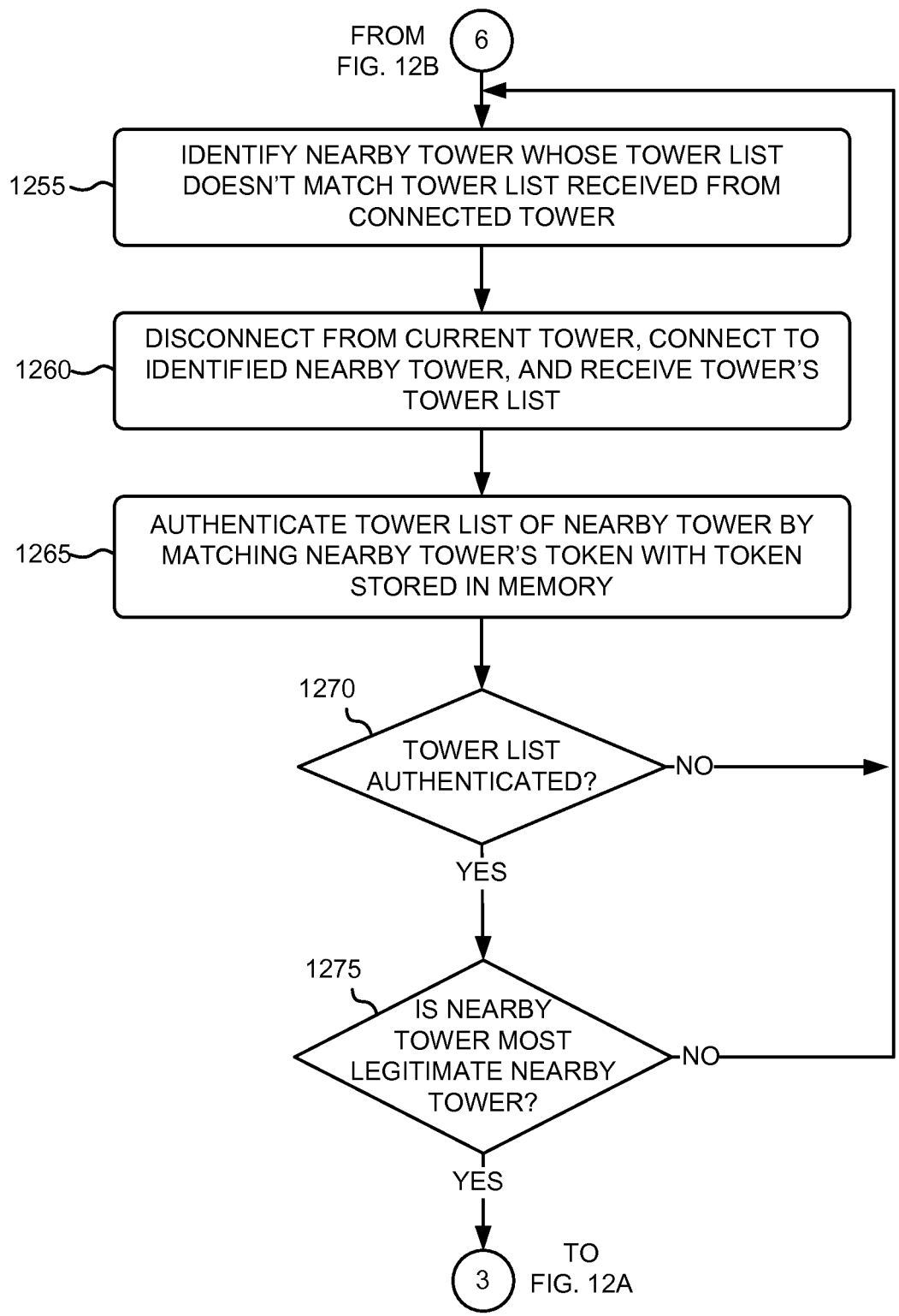

FIGS. 12A, 12B and 12C are flow diagrams illustrating an exemplary process for identifying rogue towers and identifying those rogue towers to other towers and to nearby mobile devices. The exemplary process of FIGS. 12A-12C may be implemented by a mobile device 100. The description of the exemplary process of FIGS. 12A-12C below may refer to the exemplary diagrams of FIGS. 13-16.

Figure 13:
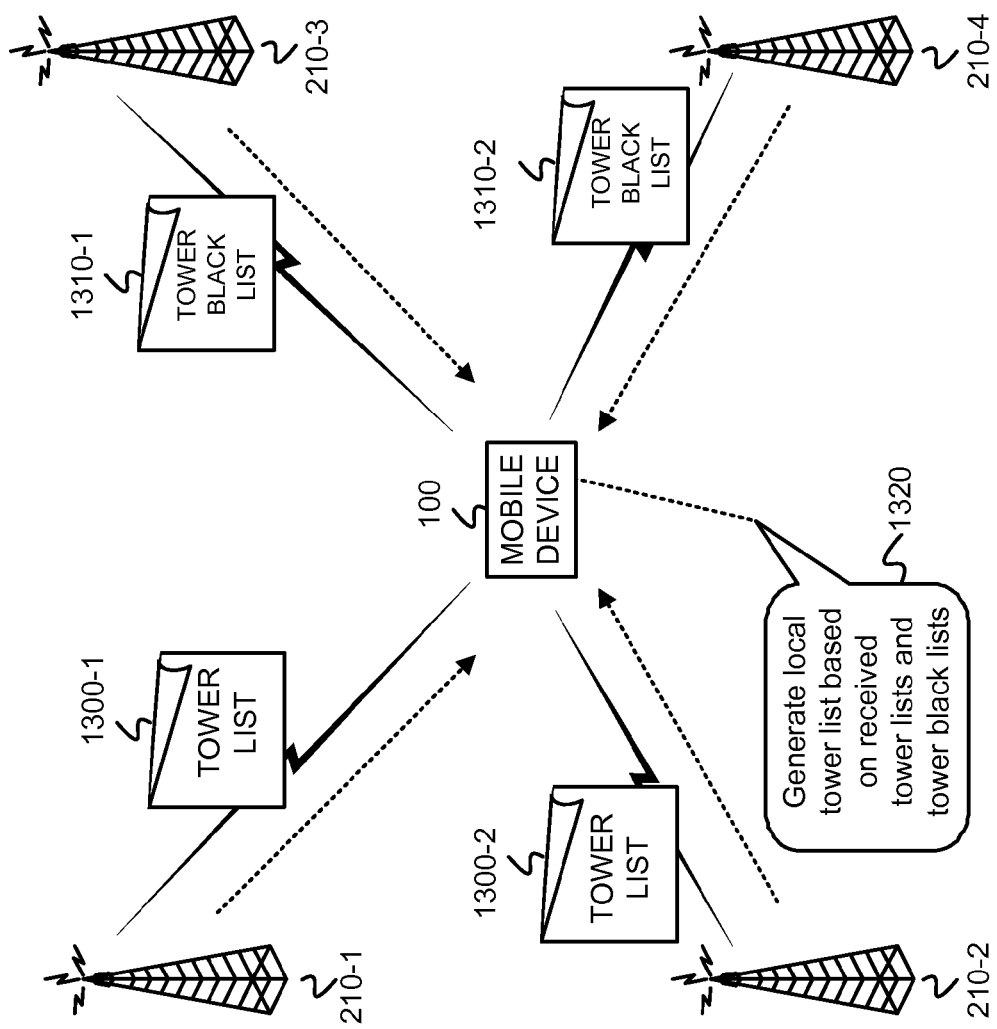

The exemplary process may include mobile device 100 receiving one or more tower lists broadcast from nearby towers (block 1200). FIG. 13 depicts an illustrative example of mobile device 100 receiving tower lists 1300-1 and 1300-2 broadcast from respective towers 210-1 and 210-2. The tower lists received from nearby towers may be similar to tower list 900 described above with respect to FIG. 9. Upon receipt of broadcast tower lists, tower list handling unit 500 of mobile device 100 may store the tower lists in tower list data structure 510.

Mobile device 100 may receive one or more tower black lists broadcast from nearby towers (block 1205). The illustrative example of FIG. 13 further depicts mobile device 100 receiving tower black lists 1310-1 and 1310-2—from respective towers 210-3 and 210-4. The tower lists received from nearby towers may be similar to tower list 900 described above with respect to FIG. 9, with the tower list listing towers that have been identified as rogue towers. Upon receipt of broadcast tower black lists, tower list handling unit 500 of mobile device 100 may store the tower black lists in tower black lists data structure 520.

Mobile device 100 may generate a local tower list based on the tower lists received in block 1200 and the tower black lists received in block 1205 (block 1210). The illustrative example of FIG. 13 depicts mobile device 100 generating 1320 a local tower list based on the received tower lists 1300-1 and 1300-2 and the tower black lists 1310-1 and 1310-2. Tower list handling unit 500 of mobile device 100 may retrieve tower lists stored in tower lists data structure 510 and tower black lists stored in tower black lists data structure 520 to generate a local tower list. The local tower list may include towers contained in the retrieved tower lists, but may exclude towers contained in the retrieved tower black lists.

Figure 14:
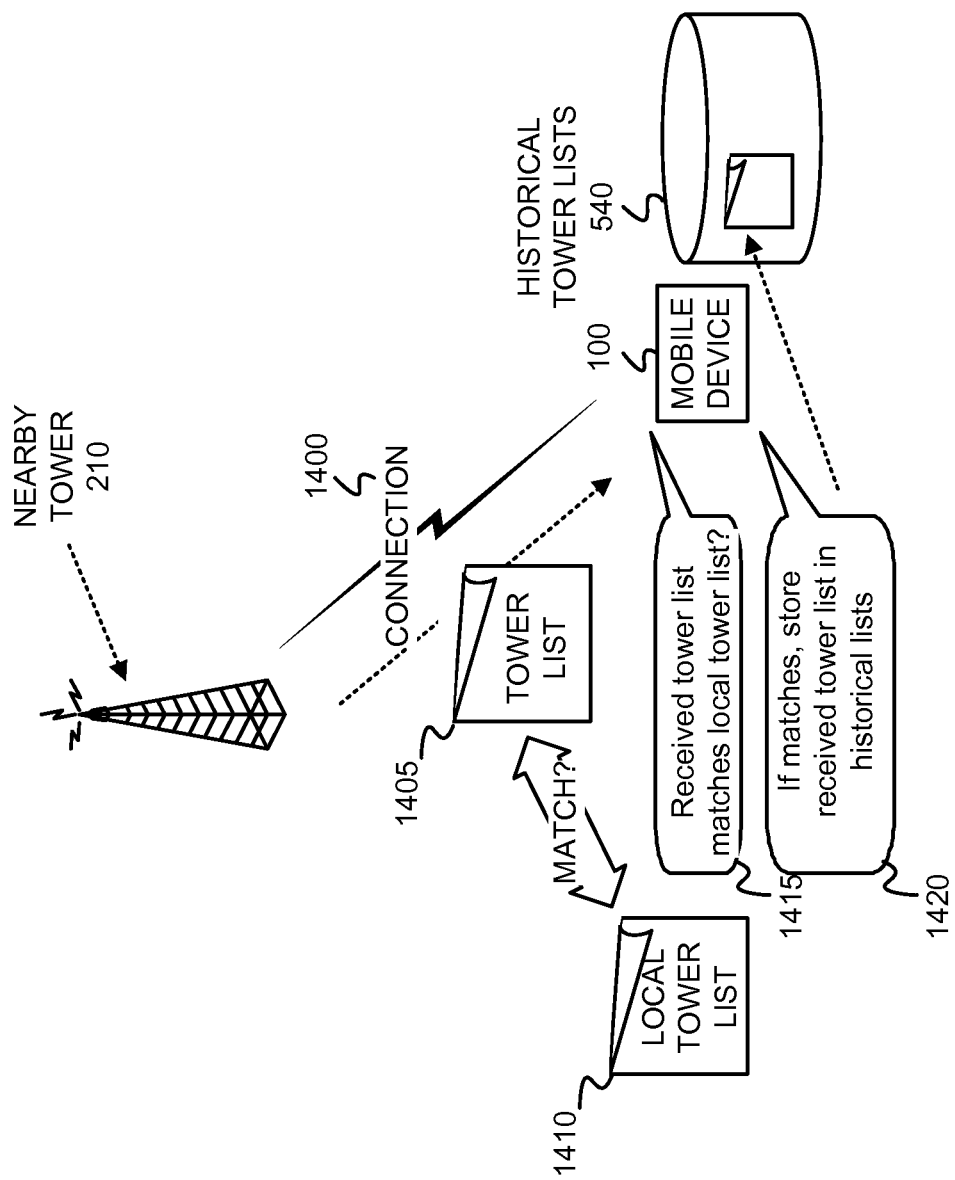

Mobile device 100 may connect to a nearby tower that is not listed in the tower black lists received in block 1205 (block 1215). Tower list handling unit 500 may identify nearby towers that have broadcast tower lists, and may cause mobile device 100 to connect to one of the identified nearby towers that is not listed in the tower black lists stored in tower black lists data structure 520. The illustrative example of FIG. 14 depicts mobile device 100 establishing a connection 1400 with a nearby tower 210. Mobile device 100 may receive a tower list from the connected tower (block 1220). Upon establishment of connection 1400, as shown in FIG. 14, tower 210 may send a tower list 1405 to mobile device 100, with tower list 1405 including a list of known, valid towers. Tower list handling unit 500 may store tower list 1405 in tower lists data structure 510.

Mobile device 100 may determine if the tower list received in block 1220 matches the local tower list generated in block 1210 (block 1225). The illustrative example of FIG. 14 depicts the comparison of tower list 1405 and previously generated local tower list 1410, and a determination 1415 if the received tower list matches the local tower list. If the tower list and the local tower list match (YES—block 1230), then the tower list received in block 1220 may be stored in mobile device 100's historical tower lists (block 1230). As shown in FIG. 14, mobile device 100 determines 1420 that the received tower list and the local tower list match, and then stores the received tower list in historical tower lists 540. The comparison of the tower list and the local tower list may include determining whether each tower contained in the tower list matches a tower contained in the local tower list.

Figure 15:
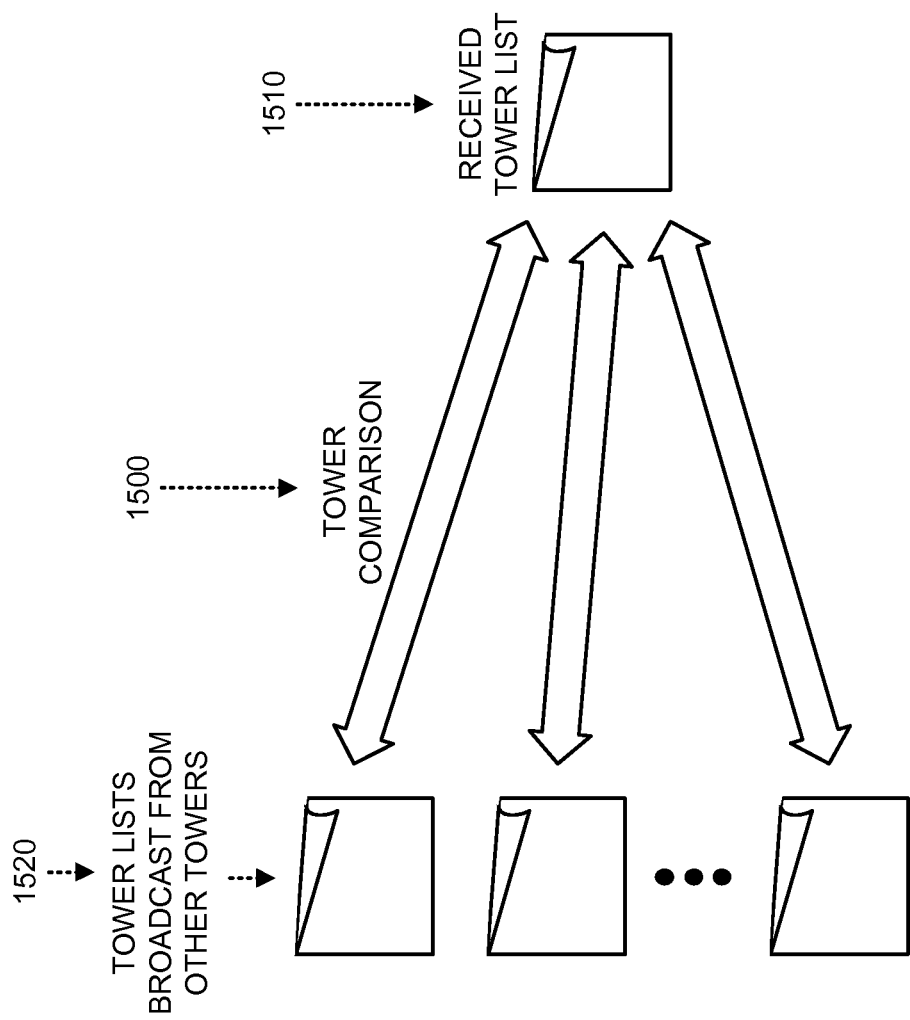

If the tower list and the local tower list don't match (NO—block 1230), then mobile device 100 may determine if all towers contained in the tower list received in block 1220 are also contained in all tower lists broadcast from other towers (block 1235). As shown in FIG. 15, mobile device 100 may perform a tower comparison 1500 between the received tower list 1510 and tower lists broadcast from other towers 1520. Tower list handling unit 500 may perform a tower by tower comparison between each tower contained in tower list 1510 and each tower contained in tower lists 1520 to determine whether there is any tower contained in tower list 1510 that is not contained in any of the tower lists 1520 broadcast from the other towers.

If any of the towers contained in the tower list are also not contained in all tower lists broadcast from other towers (NO—block 1240), then mobile device 100 may disconnect from the tower that mobile device 100 connected to in block 1215 (block 1240). The exemplary process may return to block 1215 with mobile device 100 connecting to another nearby tower that is not listed in received tower black lists.

If all towers contained in the tower list are contained in all tower lists broadcast from other towers (YES—block 1240), the mobile device 100 may determine if all towers contained in the tower list received in block 1220 are also contained in the last n tower lists stored in the historical tower lists (block 1245). As shown in FIG. 16, mobile device 100 may perform a tower comparison 1600 between the received tower list 1610 and the last n tower lists stored in historical tower lists data structure 540. Tower list handling unit 500 may perform a tower by tower comparison between each tower contained in tower list 1610 and each of the n most recent tower lists 1620 contained in historical tower lists data structure 540 to determine whether there is any tower contained in tower list 1610 that is not contained in any of the tower lists 1620. If any of the towers contained in the received tower list are not also contained in the last n tower lists (NO—block 1245), then mobile device 100 may disconnect from the tower that mobile device 100 connected to in block 1215 (block 1250). The exemplary process may return to block 1215 with mobile device 100 connecting to another nearby tower that is not listed in received tower black lists.

If all towers contained in the received tower list are contained in the last n tower lists (YES—block 1245), then mobile device 100 may identify a nearby tower whose tower list does not match the tower list received from the tower connected to in block 1215 (block 1255). Tower list handling unit 500 may analyze tower lists stored in tower lists data structure 510 to identify a tower list, received from a nearby tower, which contains towers that do not match the towers contained in the tower list received from the tower connected to in block 1215. Mobile device 100 may disconnect from the currently connected tower, connect to the nearby tower identified in block 1255, and receive that tower's tower list (block 1260).

Mobile device 100 may authenticate the tower list of the nearby tower by matching the nearby tower's token with a corresponding token stored in memory (block 1265). Tower list handling unit 500 may retrieve a previously stored token (received in a previously received tower list) and may compare the retrieved token with a token contained in the tower list received from the tower list in block 1260. If the token comparison determines that the tokens are identical, then the authentication succeeds. If the token comparison determines that the tokens are different, then the authentication fails.

Mobile tower 100 may determine if the authentication of block 1265 is successful (block 1270). If not (NO—block 1270), then the exemplary process may return to block 1255 with the identification of another, different nearby tower. If the authentication of block 1265 is successful (YES—block 1270), then a nearby tower may be identified as a tower whose tower list does not match the tower list received in block 1220 from the connected tower (block 1255).

Mobile device 100 may disconnect from the currently connected tower, connect to the nearby tower identified in block 1255, and receive the tower's tower list (block 1260). Mobile device 100 may authenticate the tower list of the nearby tower by matching the nearby tower's token with a corresponding token stored in memory (block 1265). Tower list handling unit 500 may retrieve a previously stored token (received in a previously received tower list) and may compare the retrieved token with a token contained in the tower list received from the tower list in block 1260. If the token comparison determines that the tokens are identical, then the authentication succeeds. If the token comparison determines that the tokens are different, then the authentication fails.

If the tower list fails authentication (NO—block 1270), then the exemplary process may return to block 1255 with the identification of another, different nearby tower whose tower list does not match the tower list received from the most recently connected tower. If the tower list authentication is successful (YES—block 1270), then mobile device 100 may determine if the currently connected nearby tower is the most legitimate nearby tower (block 1275). Mobile device 100 may determine if the currently connected nearby tower is the "most legitimate" nearby tower by checking tower lists stored in tower lists data structure 510 and historical tower lists data structure 540 to identify which towers are contained in all lists, and if the currently connected nearby tower is a tower contained in all of the lists. If the currently connected nearby tower is a tower contained in all of the lists stored in tower lists data structure 510 and historical tower lists data structure 540, then the currently connected nearby tower may be determined to be the "most legitimate" nearby tower.

If the currently connected tower is determined to not be a most legitimate nearby tower (NO—block 1275), then the exemplary process may return to block 1255 with the identification of another, different nearby tower whose tower list does not match the tower list received from the most recently connected tower. If the currently connected tower is determined to be a most legitimate nearby tower (YES—block 1275), then the exemplary process may continue at block 1200 with the receipt of broadcasted tower lists from nearby towers. Mobile device 100 may continue its connection with the currently connected tower.

Exemplary embodiments described herein implement rogue tower detection techniques to identify and isolate rogue towers to prevent them from sending traffic to, or receiving traffic from valid towers and/or mobile devices. Through the distribution of tower lists that contain lists of towers that are known as being valid to a central, secure server, valid towers, and mobile devices may be able to determine whether nearby towers are rogue towers such that the towers and mobile devices refuse to transmit data to and/or from the identified rogue towers.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6A, 6B, 12A, 12B and 12C, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   generating a token at a first tower in a wireless network;
   sending the token from the first tower to a network device;
   receiving, at the first tower from the network device, a list of towers that are nearby the first tower, wherein the list includes towers that are nearby the first tower that are known as valid to the network device and a respective first token associated with each of the towers that are nearby the first tower that are known as valid;
   receiving, at the first tower, tower lists broadcast from nearby towers, wherein each of the tower lists includes a second token associated with a respective one of the nearby towers;
   authenticating, at the first tower, each of the tower lists from the nearby towers by comparing the second token with the respective first token;
   identifying, at the first tower, each of the nearby towers whose second token fails authentication as a rogue tower that has been improperly placed within the wireless network to misroute or record traffic from or to mobile devices roaming within the wireless network;
   generating, at the first tower, a local tower list based on the list of towers received from the network device, but which excludes the identified nearby towers that failed authentication; and
   broadcasting the local tower list from the first tower to nearby towers and to nearby mobile devices.

2. The method of claim 1, wherein the towers that are nearby the first tower that are known as valid to the network device are further known to the network device as not being towers that have been improperly placed within the wireless network to misroute or record traffic from and/or to mobile devices roaming within the wireless network.

3. The method of claim 1, further comprising:
receiving, at the first tower, an authentication key from the network device; and
authenticating with the network device using the authentication key prior to sending the token from the first tower to the network device.

4. The method of claim 1, wherein generating the token comprises:
generating a unique number.

5. The method of claim 4, wherein generating the token further comprises:
applying a function to the unique number to generate the token.

6. The method of claim 5, wherein the function comprises a hash function.

7. The method of claim 1, further comprising:
generating, at the first tower, a local tower black list that includes the identified nearby towers that failed authentication; and
broadcasting the local tower black list from the first tower to nearby towers and to nearby mobile devices.

8. A first cellular network radio tower in a wireless network, comprising:
a transceiver configured to:
send, via the wireless network, a token to a network device,
receive, from the network device, a list of towers that are nearby the first tower, wherein the list identifies towers that are nearby the first tower that are known to be valid by the network device and includes a respective first token associated with each of the identified towers,
receive, at the first tower, tower lists generated by other towers that are nearby the first tower, wherein each of the tower lists includes a second token associated with a respective one of the nearby towers; and
a processing unit configured to:
authenticate each of the received tower lists by comparing the second token with the respective first token;
identify ones of the nearby towers as rogue towers based on failures to authenticate respective ones of the received additional tower lists, wherein the identified rogue towers comprise cellular network radio towers that have been improperly placed within the wireless network to misroute or record traffic from or to mobile devices roaming within the wireless network, and
broadcast a tower black list that lists the identified rogue towers to the nearby towers and to nearby mobile devices.

9. The system of claim 8, wherein the transceiver is further configured to receive an authentication key from the network device, and the processing unit is further configured to authenticate with the network device using the authentication key prior to the sending of the token to the network device.

10. The system of claim 8, wherein the towers that are nearby the first tower that are known to be valid to the network device are further known to the network device as not being towers that have been improperly placed within the wireless network to misroute or record traffic from and/or to mobile devices roaming within the wireless network.

11. The system of claim 8, wherein the processing unit is further configured to generate a local tower list based on the received tower lists, but which excludes the identified rogue towers, and wherein the transceiver is further configured to broadcast the local tower list to the nearby towers and the nearby mobile devices.

12. The system of claim 8, wherein the processing unit is further configured to generate the token, wherein generating the token comprises generating a unique number.

13. The system of claim 12, wherein generating the unique number comprises applying a function to the unique number to generate the token.

14. The system of claim 13, wherein the function comprises a hash function.

15. A method, comprising:
receiving tower lists at a mobile device from cellular network radio towers in a wireless network that are nearby the mobile device, wherein the tower lists identify cellular network radio towers that are not rogue towers and wherein the rogue towers comprise cellular network radio towers that have been improperly placed within the wireless network to misroute or record traffic from or to mobile devices roaming within the wireless network;
receiving tower black lists at the mobile device from the cellular network radio towers that are nearby the mobile device, wherein the tower black lists identify cellular network radio towers that are rogue towers;
connecting from the mobile device to one of the nearby cellular network radio towers based on the received tower lists and the received tower black lists;
generating, at the mobile device, a local tower list based on the received tower lists and the received tower blacklists;
receiving, at the mobile device, a tower list from the connected one of the nearby cellular network radio towers;
determining, at the mobile device, whether the generated local tower list matches the received tower list from the connected one of the nearby cellular network radio towers; and
disconnecting the mobile device from the connected one of the nearby cellular network radio towers based on a determination that the generated local tower list does not match the received tower list from the connected one of the nearby cellular network radio towers.

16. The method of claim 15, wherein connecting from the mobile device to the one of the nearby cellular network radio towers includes avoiding connecting to the towers identified as rogue towers.

17. A mobile device, comprising:
a wireless transceiver configured to:
receive tower lists from cellular network radio towers in a wireless network that are nearby the mobile device, wherein the tower lists identify towers that are not rogue towers and wherein the rogue towers comprise cellular network radio towers that have been improperly placed within the wireless network to misroute or record traffic from or to mobile devices roaming within the wireless network,
receive tower blacklists from the cellular network radio towers that are nearby the mobile device, wherein the tower blacklists identify towers that are rogue towers, and
a processing unit configured to:
cause the transceiver to connect to one of the nearby cellular network radio towers based on the received tower lists and the received tower blacklists,
cause the transceiver to receive a tower list from the connected one of the nearby cellular network radio towers,
generate a local tower list based on the received tower lists and the received tower blacklists,
determine whether the generated local tower list matches the received tower list from the connected one of the nearby cellular network radio towers, and cause the mobile device to disconnect from the connected one of the nearby cellular network radio towers based on a determination that the generated local tower list does not match the received tower list from the connected one of the nearby cellular network radio towers.

18. The mobile device of claim 17, wherein connecting from the mobile device to the one of the nearby cellular network radio towers includes avoiding connecting to the towers identified as rogue towers.

* * * * *